United States Patent [19]

Javernick et al.

[11] Patent Number: 5,848,277

[45] Date of Patent: Dec. 8, 1998

[54] METHOD FOR PROVIDING BOTH LEVEL-SENSITIVE AND EDGE-SENSITIVE INTERRUPT SIGNALS ON A SERIAL INTERFACE BETWEEN A PERIPHERAL AND HOST

[75] Inventors: Michael Lee Javernick, Colorado Springs, Colo.; Robert Dennis Crawford, Livonia, Mich.

[73] Assignee: Ford Motor Company, Dearborn, Mich.

[21] Appl. No.: 565,653

[22] Filed: Feb. 12, 1996

[51] Int. Cl.$^6$ .................................................. G06F 13/00
[52] U.S. Cl. .......................... 395/733; 395/735; 395/737; 364/940; 364/240
[58] Field of Search .................................. 395/733, 737, 395/735, 275, 725; 364/940, 259, 240, 238, 941, 241

[56] References Cited

U.S. PATENT DOCUMENTS

| | | |
|---|---|---|
| 4,715,031 | 12/1987 | Crawford et al. . |
| 4,890,219 | 12/1989 | Heath et al. ............................ 364/200 |
| 5,101,497 | 3/1992 | Culley et al. ........................... 395/725 |
| 5,142,625 | 8/1992 | Nakai ..................................... 395/275 |
| 5,179,707 | 1/1993 | Piepho .................................... 395/725 |
| 5,261,107 | 11/1993 | Klim et al. .............................. 395/725 |
| 5,396,633 | 3/1995 | Mayer et al. ........................... 395/725 |
| 5,499,384 | 3/1996 | Lentz et al. ............................. 395/821 |
| 5,524,111 | 6/1996 | Le Pennec et al. ..................... 370/84 |
| 5,535,420 | 7/1996 | Kardach et al. ........................ 395/868 |
| 5,551,044 | 8/1996 | Shah et al. .............................. 395/750 |
| 5,555,413 | 9/1996 | Lohman et al. ........................ 395/733 |
| 5,613,128 | 3/1997 | Nizar et al. ............................. 395/739 |

Primary Examiner—Meng-Ai T. An
Assistant Examiner—Eric S. Thlang
Attorney, Agent, or Firm—Richard D. Dixon

[57] ABSTRACT

A method or protocol for generating an Interrupt Signal for communication between a peripheral device and a host processor having either a level-sensitive or an edge-sensitive interrupt detector. After receiving an active interrupt request, and after confirming that the Chip Select signal is released, the interrupt signal is transitioned to an active level. After receiving an active Chip Select signal and multiple Clock pulses from the host as confirmation of receipt of the Interrupt Signal, the Interrupt Signal is transitioned to its inactive state. If the interrupt request is still pending, and when the Chip Select signal is released, then the Interrupt Signal is again made active. Maintaining the active level for the Interrupt Signal until the confirmation is returned from the host will activate level-sensitive detectors, while edge-sensitive detectors in the host will be activated by the multiple transitions occurring if the host does not service the interrupt request in the peripheral.

10 Claims, 3 Drawing Sheets

METHOD FOR PROVIDING BOTH LEVEL-SENSITIVE AND EDGE-SENSITIVE INTERRUPT SIGNALS ON A SERIAL INTERFACE BETWEEN A PERIPHERAL AND HOST

BACKGROUND OF THE INVENTION

1. Field of the Invention

This invention generally relates to a signal protocol for communicating with an interrupt controller of a host computer system and, more particularly, to a single signal protocol for the peripheral interrupt signal that will actuate either an edge-triggered or a level-triggered detector within the host microcontroller.

2. Prior Art

Computer systems having a central host processor and a plurality of peripheral devices normally require the host to interrogate the peripheral devices and, on occasion, respond to a service request, or interrupt, from one or more of the the peripheral devices. Peripheral devices normally include an interrupt pin which is coupled to a corresponding pin on the microprocessor. The peripheral device generates an interrupt signal at this interrupt pin indicating that the peripheral requires some type of servicing from the host.

Two types of interrupt signal protocols or formats have become well-established in the computer and electronics areas. A level-sensitive interrupt signal format is characterized by the interrupt signal from the peripheral remaining true (at a constant level) until the host services the interrupt request. An edge-triggered interrupt signal simply comprises a pulse of short duration, which is typically generated only once per interrupt event.

When a host interrupt controller is required to service both types of interrupt signals, it is normal for the host to include both a level detector and an edge detector, or the host may be fixed for level or edge dtectors, but not both. The detectors may be switched depending upon the specific form of the peripheral device coupled to the input. In the alternative, the host may include a programmable controller that must be reprogrammed in response to the type of peripheral coupled to the host. In particular, the edge-triggered interrupt signals are difficult to interface with at the host, since if a level-type interrupt signal from peripheral is transmitted, the constant level output will mask any "new" events from being recognized by the host. This can cause a "lock-up" of the host peripheral host communication link.

The problem of enabling the host to interact with and respond to peripheral devices employing either level sensitive or edge sensitive interrupt signals has been approached in several different ways in the prior art.

U.S. Pat. No. 5,261,107 discloses an interrupt controller which is programmable such that each of the inputs may respond to one type interrupt signal, either an edge-sensitive interrupt signal or a level-sensitive interrupt signal, but not without reprogramming. This is contrasted with the present invention that allows a single signal to trigger an interrupt controller having either an edge-sensitive detector or a level-sensitive detector.

As stated in column 3, lines 44 through line 53, the interrupt controller can be used with a variety of peripheral devices each having either an edge-triggered signal or a level-triggered interrupt signal. The ICW5 register 108 allows the interrupt controller to program each of the inputs to be either edge-sensitive or level-sensitive on a per interrupt basis, with the ICW5 register 108 including a bit corresponding to each interrupt request input (see column 7). Whenever a new peripheral is attached to an input of the interrupt controller, register ICW5 is sent a programming bit to command it to function as either an edge detector or a level detector.

U.S. Pat. No. 5,101,497 is similar to U.S. Pat. No. 5,261,107 except that the level-sense and edge-sense detectors attached to each interrupt input line may be reprogrammed any time after initialization rather than at initialization.

U.S. Pat. No. 4,890,219 teaches the use of an interrupt controller that may be switched from the level detect to the edge detect mode. The particular problem addressed relates to software that sends a command (usually during setup or initialization) through the CPU to the interrupt controller to change the mode of operation from level detect to edge detect for the interrupt signals from selected peripherals. This is sometimes referred to as non-standard software, such as may be used in unusual games and other applications. If the peripherals connected to the interrupt controller all generate level-type interrupt signals, the CPU and the interrupt controller would "lock up" if the interrupt controller were to successfully respond to the command from the CPU to change the input detector on the interrupt controller from level-detect to edge-detect mode. In order to prevent this lock-up situation, Buffer Control Logic, as shown in block 20 of FIG. 1 is provided for sensing such a command from the CPU to change the interrupt controller to the edge-detect mode. This Buffer Control Logic block 20 intercepts such commands and responsive thereto commands the interrupt controller to remain in the level detect mode (see columns 3 and 4). In this manner, the peripherals will still be able to communicate with the interrupt controller and the CPU, although the non-standard program originating the command may not run properly.

In contrast to these prior art solutions, the present invention relates to a signal protocol to be generated by the peripheral device that may be recognized by a host employing either a level-sensitive interrupt detector or an edge-sensitive interrupt detector. No mode switching or signal intercepts are required. Using this signal protocol, the peripheral device can interface with the host regardless of the configuration of the host interrupt detector.

It is, therefore, an object of the of the present invention to generate a peripheral interrupt signal protocol that, without modification, will successfully interact with the host controller employing either an edge-sensitive interrupt detector or the level-sensitive interrupt detector.

SUMMARY OF THE INVENTION

A method for generating an Interrupt Signal for communication between a peripheral device and a host having either a level-sensitive or an edge-sensitive interrupt detector, includes the following steps. An active interrupt request is received and responsive thereto a determination is made if the Chip Select signal from the host is released, or not asserted. After the Chip Select signal is released, the Interrupt Signal is transitioned to and maintained at its active level. Responsive to receiving an active Chip Select signal and multiple Clock pulses from the host as confirmation of receipt of the Interrupt Signal, the Interrupt Signal is transitioned from active to inactive. The Interrupt Signal is again transitioned and maintained from the inactive to the active level in response to the interrupt request being active and the Chip Select signal being released. According to this signal protocol, the step level will activate any level-sensitive detectors in the host, and the combination of transitions in the Interrupt Signal will activate edge-sensitive detectors in the host.

BRIEF DESCRIPTION OF THE DRAWINGS

Other objects features and advantages will be apparent from a careful study of the written description and the drawings in which.

DESCRIPTION OF THE PREFERRED EMBODIMENT

Figure 1:
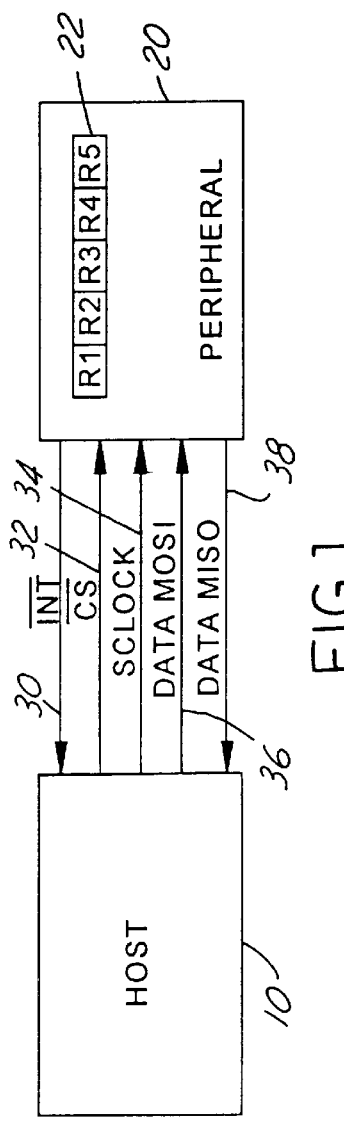
FIG. 1 illustrates a schematic block diagram representation of the host microcontroller as coupled to the peripheral device.

Referring to FIG. 1, a host microprocessor 10 is coupled to a peripheral device 20 by way of five signal lines including the interrupt signal line 30, the chip select signal line 32, the system clock line 34 and two data lines, the data MOSI line 36 and the data MISO line 38. The peripheral device 20 includes several status and command registers, illustrated as R1 through R5 in the peripheral device 20. In the first preferred embodiment of the present invention, the host microcontroller 10 comprises a Motorola 68HC11, and the peripheral device 20 comprises a Ford "Zinger" Controller Chip, Ford Part No. N7100070FTCFCA.

Figure 3:
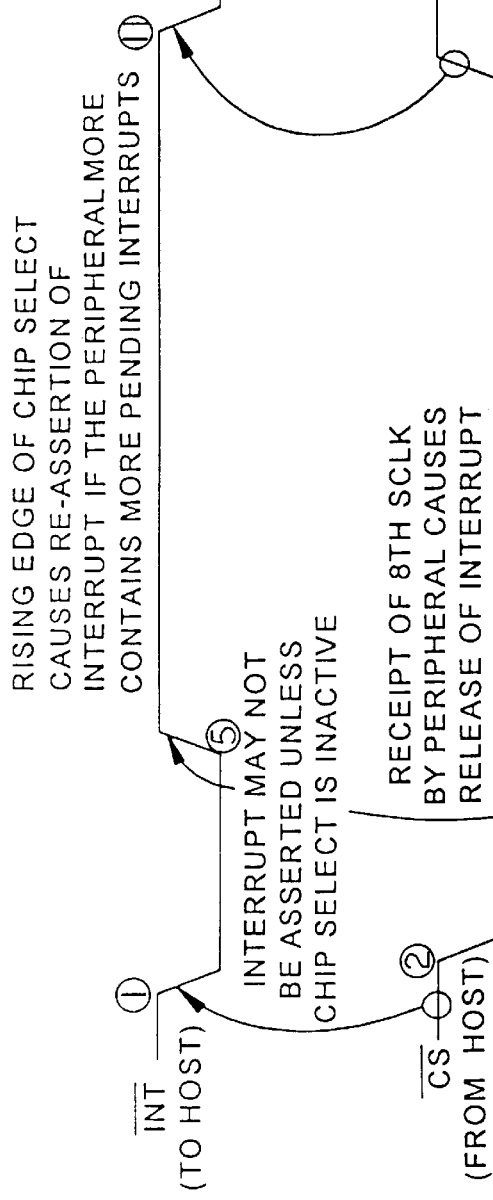
FIGS. 3A to 3E illustrates the communications signals on each of the lines between the host and the peripheral as a function of time.

As illustrated in FIG. 3, the signals transmitted along these lines between the host 10 and the peripheral 20 use NRZ coding and are transmitted at bit rates of approximately 2.0 Mbps in a synchronous communications mode. Typical signal levels vary between 0 and 5 volts. While the first preferred embodiment is designed to work in this standard SPI format and bit rate, other communication networks of different designs could benefit from the signal protocol of the present invention.

As used herein, the term active generally is equivalent to the terms logically true and enabled. The term inactive is generally equivalent to the terms logically false and disabled. The term assert means that the signal is made active or true, and negate means that the signal is made inactive or logically fales. The absolute levels and polarity of the signals discussed herein may be varied as required for any particular implementation, since the present invention may be implemented in a variety of technologies.

Figure 2:
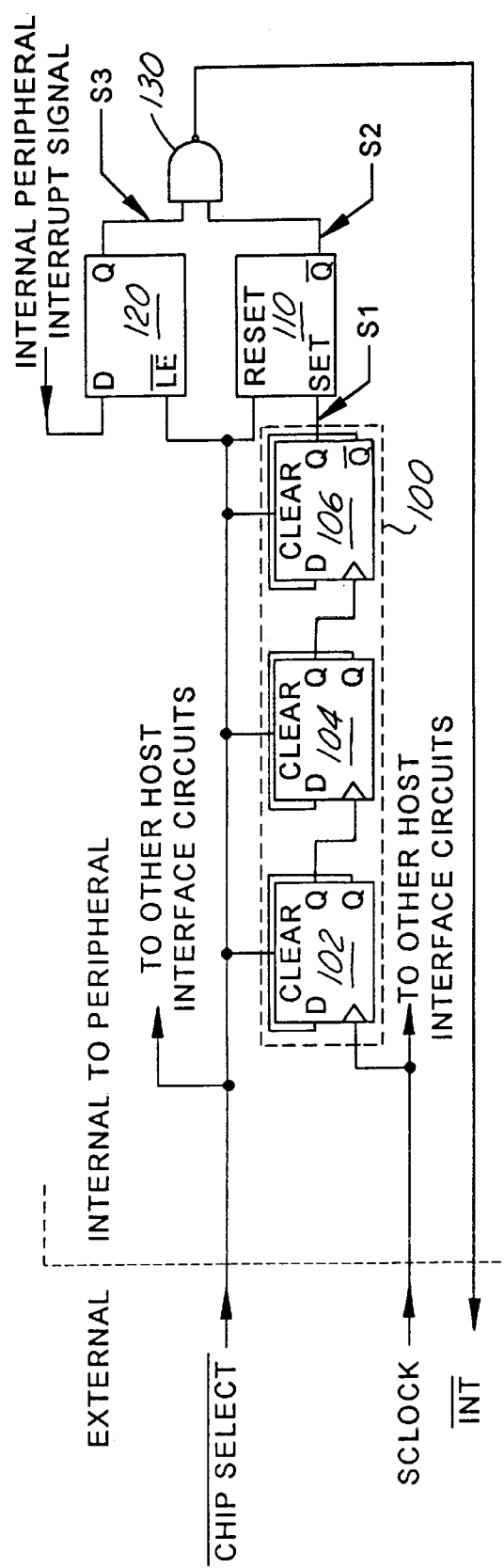
FIG. 2 is a schematic block diagram illustrating the logic and circuitry used for the interrupt signal protocol generator in accordance with the present invention.

With reference now to FIG. 2, the circuit for implementing the present invention consists of a divide by 8 counter 100 which is formed by flip flops 102, 104 and 106, a set-reset flip flop 110, a transparent latch 120 and a NAND gate 130. The NAND gate 130 generates the INT* (Interrupt) signal to the host processor 10. As used herein, the symbol * will refer to the inverse or bar representation of the logical signal with which it is associated.

The input signals to this circuit are defined as follows:

INT* is the active low interrupt signal from the peripheral device to the host processor.

Chip Select* (or CS*) is an active low signal from the host to the peripheral device indicating that the host is communicating with the peripheral device.

SCLOCK is a system clock signal from the host to the peripheral device which provides clock pulses to synchronize data transfer on the serial data lines.

Internal Peripheral Interrupt Signal is asynchronous to Chip Select* and SCLOCK. This signal represents the OR condition of multiple sources within the peripheral and remains true (high) as long as any interrupts within the peripheral are pending.

The circuit illustrated in FIG. 2 has been designed to implement the following logic requirements for the interrupt signal protocol:

1. If the asynchronous Interrupt request from the peripheral is true and the Chip Select* signal from the host is not true/inactive (high), then the interrupt INT*(low) signal is asserted. INT* remains asserted (low) until the host drives Chip Select* low and provides 8 SCLOCK pulses, at which time INT* is released (to the high state).

This logic assures that when the peripheral device is sending an Interrupt signal to the host, and when the host has not yet acknowledged the interrupt request by changing the Chip Select* signal to true (high), the peripheral device will maintain the Interrupt* Signal asserted (low) until the host acknowledges the interrupt request.

In FIG. 3, the INT* signal drops from high to low at point 1 and remains at the low level until the host acknowledges the interrupt request by changing Chip Select* from high/inactive to low/active. The peripheral device transitions the INT* signal back to high at point 5 after 8 SCLOCK pulses have been received from the host (from time period 3 to 4). This signal format will properly control a host with level sensitive interrupt detectors, because the detector is already triggered before the transition at point 5 in FIG. 3B.

2. If Chip Select* is low/active before an asynchronous peripheral interrupt occurs, the INT* line will not be asserted until Chip Select* is deactivated to the high/inactive mode.

This logic assures that the peripheral will not send an interrupt signal to the host when the host is already transmitting to or receiving data from the peripheral, thus preventing peripheral access conflicts within the host softward routines (interrupt driven and non-interrupt driven routines).

3. If the host transaction cleared the interrupt source, the INT* signal will not be re-asserted until after Chip Select is released (high/inactive).

This logic assures that the Interrupt Signal will not be re-asserted (at point 11 in FIG. 3A) until after the Chip Select signal goes high/inactive (at point 10 in FIG. 3B).

4. If the host transaction did not clear all of the pending interrupt sources within the peripheral, then the INT* signal is re-asserted only after Chip Select is released to the inactive/high level.

This logic assures that if the cause of the interrupt was not resolved within the peripheral by the transaction with the host, then the INT* signal will be transitioned from high to low (at point 11 in FIG. 3A) only after Chip Select has been released (at point 10).

This series of pulses in the INT* line represented by transitions 1, 5 and 11 in FIG. 3 will properly control a host with edge-sensitive interrupt detectors.

CIRCUIT OPERATION

The operation of the circuit illustrated in FIG. 2 can be explained with regard to two operating modes representative of when the Internal Peripheral Interrupt Signal generated when Chip Select* is inactive (Case 1), and when the Internal Peripheral Interrupt Signal Generated when Chip Select* is active (Case 2).

Case 1—Internal Peripheral Interrupt Signal Generated when Chip Select* is Inactive With continuing reference to FIG. 2, if the Chip Select Signal* from the host is inactive (high), the Latch Enable* signal to latch 120 is high. This allows information on the D input to latch 120 to flow through to the Q output. Therefore the Q output of latch 120 will follow the D input, which is connected to the Internal Peripheral Interrupt Signal. The signal S3 applied to the NAND gate 130 will be high. Additionally, set-reset flip-flop 110 is held at reset because the Chip Select* signal is high. The Q* output of reset flip flop 110 will be high when reset is true. Therefore, signal S2 is high. Since both inputs to the NAND gate 130 are high, the output will be driven low, thus generating an active INT* signal to the host. This signal will remain true as long as the Q output of latch 120 is high and the Q* output of reset flip flop 110 is high.

When the host 10 communicates with the peripheral 20 in order to service the interrupt request, it will first assert Chip Select* low. This will remove the RESET signal from the reset flip flop 110, but the state of Q* will not change, and INT* will remain low. At this point the divide by eight counter 100 formed by flip flops 102, 104 and 106 is released from the RESET state, since the CLEAR inputs are changed to the low state. The counter circuit 100 will then count the clock pulses appearing on the SCLOCK line. When eight clock pluses have been detected (while Chip Select* remains low) the Q output of flip flop 106 will go high (signal S1). The low-to-high transition of S1 will set reset flip flop 110, which will force the Q* output low (signal S2). Subsequent transitions of the Q output of flip flop 106 are not significant. When signal S2 is low, it disables the NAND gate 130, and INT* is forced high (inactive).

Therefore, according to this signal protocol, INT* is released only after the host asserts Chip Select and provides 8 clock pulses to the peripheral 20.

At the end of the host transaction (which may include many serial bytes) the host will release Chip Select*. This will cause the counter chain 100 and reset flip flop 110 to be reset, which will cause signal S2 to go high. This will enable one input of the NAND gate 130. If the host transaction is successful in clearing/resolving the Internal Peripheral Interrupt Signal, the Q output of latch 120 will be low because the high state of Chip Select* has placed the latch 120 in transparent mode, and the signal on the D input of latch 120 passes directly to the Q output. Thus signal S3 is low and INT* is not re-asserted once Chip Select is released. However, if the host transaction did not clear the Internal Peripheral Interrupt Signal, the signal S3 will be high and INT* will be driven low on the rising edge of Chip Select.

Case 2—Internal Peripheral Interrupt Signal Generated when Chip Select* is Active If the Chip Select Signal from the host is active (low), the Latch Enable* signal to latch 120 is also low. The falling edge of Chip Select* has previously latched the state of the D input on latch 120, which in Case 2 is low or inactive. Thus signal S3 is low and the input to the NAND gate 130 prevents INT* from being generated after Chip Select* has been asserted.

If the Internal Peripheral Interrupt Signal becomes active during the time when Chip Select is active, the output of latch 120 will not change. Once Chip Select* is released (high), the latch 120 again becomes transparent and output Q (signal S3) will follow the high input on the D input. Since signal S2 will be high when Chip Select* is high, the INT* signal will be generated.

The key elements of the functional implementation of the new signal protocol in accordance with the present invention may be summarized as follows:
1. The chip select line from the host controls the generation of the interrupt signal from the peripheral device.
2. The serial clock line from the host controls the release of the interrupt signal from the peripheral device.
3. The peripheral host interface logic will:
   a. Generate (when appropriate) an active interrupt signal to the host, provided that the host has not asserted chip select
   b. Not allow the assertion of the interrupt signal if chip select has been asserted by the host.
   c. Release the interrupt signal after eight clock transitions of the serial clock line from the host, regardless of the state of the internal interrupt status within the peripheral (this delay prevents glitching of the interrupt line)
   d. Retain the interrupt state within the peripheral until the release of chip select by the host.
   e. Re-assert the interrupt if (i) the host interaction has not resolved the interrupt state within the peripheral or (ii) any remaining interrupt condition exists within the peripheral device.
   f. Not re-assert interrupt if the host transaction has resolved this status condition within the peripheral which caused the assertion of the interrupt signal.

Figure 4:
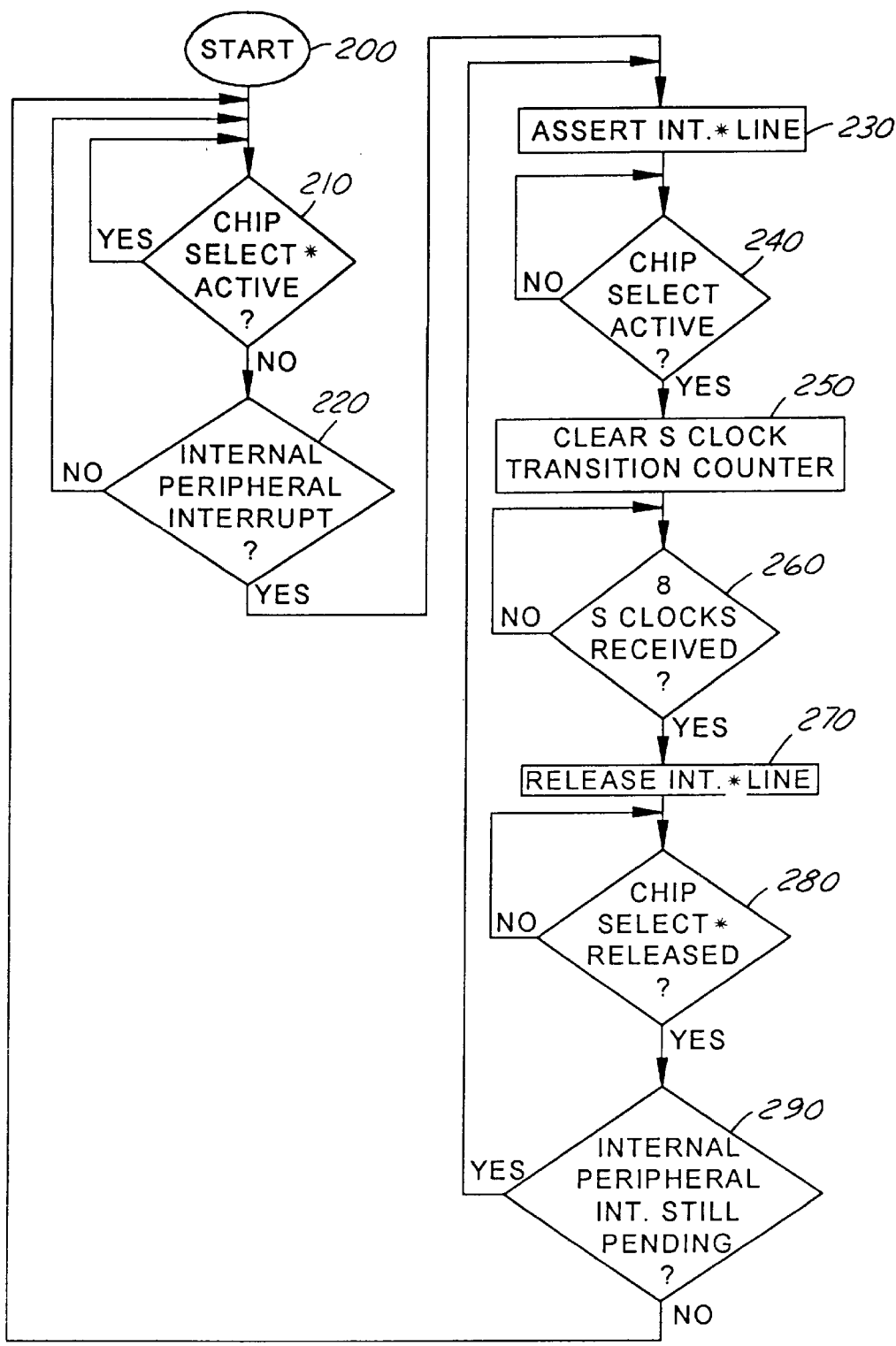
FIG. 4 is a flow diagram for the logic circuitry shown in FIG. 2.

A flowchart illustrating the logical implementation of the present invention is shown in FIG. 4. The flowchart illustrates a continuous process (no "end" statement) that is used by the peripheral to generate a signal protocol that supports both level and edge compatible interrupts to the host processor. Data transactions on the part of the host and peripheral are not shown.

After reset or start at step 200, blocks 210 and 220 are continously executed. If Chip Select* is active, the process waits until Chip Select* is released. Then, if an internal peripheral interrupt is not active, the process loops back to block 210, checking for these conditions again.

If Chip Select is not active and the internal peripheral interrupt is active, blocks 230 through 290 are executed. The *INT line is asserted, and the process waits for Chip Select* to go active (block 240). Once Chip Select is active, the SCLOCK transition counter is cleared. The next block 260 will count 8 SCLOCK pulses, at which piont block 270 will release the INT* line. Block 280 waits until Chip Select* is released, and block 290 determines if any interrupts remain pending within the peripheral. If so, a branch to block 230 occurs to assert the INT* line again. If not, the process returns to the beginning at block 200/210.

A peripheral device generating a signal in accordance with the above requirements will be compatible simultaneously with a level and edge-triggered interrupt detector on the host central processing unit (CPU). The requirements of the level-sensitive interrupt signal are satisfied because the interrupt line remains active until the host responds to the interrupt signal from the peripheral, which assures that the interrupt signal is registered with the host. The requirements for an edge-triggered interrupt signal are satisfied because a new interrupt edge is generated for all interrupt conditions, including cases where the host does not resolve an interrupt condition after communicating with the peripheral, or where multiple interrupt conditions exist simultaneously within the peripheral.

While the foregoing preferred embodiment has been illustrated as the preferred mode of implementing the present invention, it will be apparent to one skilled in this art that neither the drawings nor the discrepancies are to be considered as limiting or restricting the scope of the invention, since many modifications, enhancements and improvements may be made without departing from the spirit of the invention and the coverage of the following claims.

We claim:

1. A method for generating an Interrupt Signal for communication between a peripheral device and a host having either a level-sensitive or an edge-sensitive interrupt detector, comprising the steps of:
   A. receiving an active interrupt request and responsive thereto determining if Chip Select from the host is released, and
   B. responsive to Chip Select being released, generating the Interrupt Signal in a serial data interface protocol having a waveform determined by;
      B1. transitioning and maintaining the Interrupt Signal to active,
      B2. receiving an active Chip Select Signal and multiple Clock pulses from the host as confirmation of receipt of the Interrupt Signal, and responsive thereto transitioning the Interrupt Signal from active to inactive, and
      B3. transitioning and maintaining the Interrupt Signal from inactive to active responsive only to the interrupt request still being active and Chip Select being released,
   whereby the level change of the Interrupt Signal waveform in step B1 will activate level-sensitive detectors and the combination of transitions in the Interrupt Signal waveform in steps B1, B2 and B3 will activate edge-sensitive detectors.

2. The method as described in claim 1, further including the steps of repeating step B1, B2 and B3 until the cause of the interrupt request is resolved by the host.

3. The method as described in claim 1 wherein step B2 further comprises the step of receiving at least 8 clock pulses from the host after receiving an active Chip Select signal.

4. A method for generating an Interrupt Signal on a serial data interface line for communication from a peripheral device to a host having either a level-sensitive or an edge-sensitive interrupt detector, comprising the steps of:
   A. receiving an active Interrupt Signal request and responsive thereto determining if Chip Select from the host processor is released, and
   B. responsive to Chip Select being released, generating the Interrupt Signal in a serial data interface format by;
      B1. transitioning and maintaining the Interrupt Signal to active level,
      B2. receiving an active Chip Select Signal and multiple Clock pulses from the host processor as confirmation of receipt of the Interrupt Signal, and responsive thereto transitioning the Interrupt Signal from active to inactive level, and
      B3. transitioning and maintaining the Interrupt Signal from inactive to active level responsive only to the Interrupt Signal request still being active and Chip Select being released,
   whereby the active level of the Interrupt Signal on the serial data interface line from the peripheral in step B1 will activate level-sensitive detectors and the combination of transitions in steps B1, B2 and B3 will activate edge-sensitive detectors.

5. The method as described in claim 4, further including the step of repeating step B1, B2 and B3 until a cause of the Interrupt Signal request is resolved by the host processor.

6. The method as described in claim 4 wherein step B2 comprises the step of receiving at least 8 clock pulses from the host processor after receiving an active Chip Select from the host processor.

7. A circuit for generating an Interrupt Signal, compatible with either a level-sensitive or an edge-sensitive interrupt detector, over a serial data interface line for communication from a peripheral device to a host processor generally coupled together with at least lines for Interrupt, Chip Select, and System Clock Signals, comprising:
   a first circuit for receiving an active Interrupt Signal request and responsive thereto determining if a Chip Select Signal from the host processor is released,
   a control circuit, coupled to said first circuit and the serial data interface line, actuated only responsive to the Chip Select Signal being released, for generating said Interrupt Signal in a serial data interface format, said control circuit comprising;
      a second circuit for transitioning and maintaining said Interrupt Signal to active,
      a third circuit for receiving an active Chip Select signal and multiple Clock pulses from the host processor as confirmation of receipt of said Interrupt Signal, and responsive thereto transitioning said Interrupt Signal from active to inactive, and
      a fourth circuit for transitioning and maintaining said Interrupt Signal from inactive to active responsive only to the Interrupt Signal request still being active and Chip Select being released,
   whereby the level of said Interrupt Signal on the serial data interface line from said second circuit will activate level-sensitive detectors and the combination of transitions from said second and fourth circuits will activate edge-sensitive detectors in the host processor.

8. The circuit as described in claim 7, wherein said second circuit comprises one of an AND gate and a NAND gate.

9. The circuit as described in claim 7, wherein said third circuit comprises a divide by 8 counter coupled to and for counting at least 8 clock pulses from the host, and a logical AND gate coupled thereto for transitioning the Interrupt Signal responsive to receiving both the 8 clock pulses and the Chip Select signal.

10. A circuit for generating an Interrupt Signal, compatible with either level-sensitive or an edge-sensitive interrupt detectors coupled to a serial data interface line, for communication from a peripheral device to a host processor generally coupled together with at least lines for Interrupt, Chip Select, and System Clock Signals, comprising:
   a first circuit for receiving an active Interrupt Signal request and responsive thereto determining if a Chip Select Signal from the host processor is released,
   a control circuit, coupled to said first circuit and the serial data interface line and actuated only responsive to the Chip Select Signal being released, for generating said Interrupt Signal in a serial data interface format, said control circuit comprising;
      a second circuit, comprising one of an AND gate and a NAND gate, for transitioning and maintaining said Interrupt Signal to active,
      a third circuit for receiving an active Chip Select signal and multiple Clock pulses from the host processor as confirmation of receipt of said Interrupt Signal, and responsive thereto transitioning said Interrupt Signal from active to inactive, wherein said third circuit comprises a divide by 8 counter coupled to and for counting said at least 8 clock pulses from the host, and a logical AND gate coupled thereto for transitioning said Interrupt Signal responsive to receiving both the 8 clock pulses and the Chip Select Signal, and a fourth circuit for transitioning and maintaining said Interrupt Signal from inactive to active responsive only to the Interrupt Signal request still being active and Chip Select being released, whereby the level of said Interrupt Signal on the serial data interface line from said second circuit will activate level-sensitive detectors and the combination of transitions from said second, third and fourth circuits will activate edge-sensitive detectors.

* * * * *